(12) United States Patent
Wang et al.

(10) Patent No.: US 8,705,235 B2
(45) Date of Patent: Apr. 22, 2014

(54) FAN UNIT ASSEMBLY

(75) Inventors: Jia-Bin Wang, Shanghai (CN); Gui-Jiao Zhang, Shanghai (CN)

(73) Assignee: Inventec Corporation, Taipei (TW)

( * ) Notice: Subject to any disclaimer, the term of this patent is extended or adjusted under 35 U.S.C. 154(b) by 238 days.

(21) Appl. No.: 13/344,899

(22) Filed: Jan. 6, 2012

(65) Prior Publication Data
US 2013/0064650 A1  Mar. 14, 2013

(30) Foreign Application Priority Data
Sep. 9, 2011 (CN) .......................... 2011 1 0267061

(51) Int. Cl.
*H05K 7/20* (2006.01)

(52) U.S. Cl.
USPC ............................ 361/695; 165/121; 454/184

(58) Field of Classification Search
None
See application file for complete search history.

(56) References Cited

U.S. PATENT DOCUMENTS

| | | | | |
|---|---|---|---|---|
| 6,611,427 B1* | 8/2003 | Liao | ............... | 361/695 |
| 6,851,925 B2* | 2/2005 | Chuang | ............... | 415/126 |
| 7,236,361 B2* | 6/2007 | Cote et al. | ............... | 361/695 |
| 7,251,135 B2* | 7/2007 | Crippen et al. | ............... | 361/695 |
| 7,385,814 B1* | 6/2008 | Chen | ............... | 361/695 |
| 7,699,692 B2* | 4/2010 | Yin | ............... | 454/184 |
| 8,246,301 B2* | 8/2012 | Li | ............... | 415/213.1 |
| 8,508,941 B2* | 8/2013 | Simon et al. | ............... | 361/695 |
| 2009/0021911 A1* | 1/2009 | Lee et al. | ............... | 361/695 |

FOREIGN PATENT DOCUMENTS

| | | |
|---|---|---|
| TW | M260082 | 3/2005 |
| TW | M318896 | 9/2007 |
| TW | M328174 | 3/2008 |
| TW | M401971 | 4/2011 |

* cited by examiner

*Primary Examiner* — Boris Chervinsky
(74) *Attorney, Agent, or Firm* — CKC & Partners Co., Ltd.

(57) ABSTRACT

A fan unit assembly includes a fan rack, fan units and handles. The fan rack includes a carrier and parallel partition boards erected on the carrier to define fan-disposing regions. The partition board has at least one first positioning part and at least one first guiding part facing the corresponding fan-disposing region. The fan unit has two side surfaces and a front surface. The front surface connects the side surfaces. The side surfaces respectively have a second guiding part engaged with the first guiding part. The fan unit is suitable to move along the first guiding part through the second guiding part. The handles are disposed at the front surface and both ends thereof are bent to form two pivot portions respectively pivoted on the side surfaces. Each pivot portion has a second positioning part. When the handle rotates towards the front surface, the positioning parts interfere with each other.

10 Claims, 6 Drawing Sheets

FAN UNIT ASSEMBLY

CROSS-REFERENCE TO RELATED APPLICATION

This application claims the priority benefit of China application serial no. 201110267061.0, filed on Sep. 9, 2011. The entirety of the above-mentioned patent application is hereby incorporated by reference herein and made a part of this specification.

BACKGROUND OF THE INVENTION

1. Field of the Invention

The invention generally relates to an assembly structure applied in fan units, and more particularly, to a fan unit assembly simply and fast assembled.

2. Description of Related Art

A server is a core computer serving many other computers in a network system and provides network users with required disks and service functions such as printing. Meanwhile, the server can provide the clients with sharing various resources in a network environment. The basic architecture of a server is roughly same as a common personal computer (PC) and is composed of a CPU, a memory and I/O equipments, and buses are used to interconnect them: connecting the CPU and the memory through a north-bridge chip and connecting the I/O equipments through a south-bridge chip.

The server gets heat-dissipating mostly by running a plurality of heat-dissipating fans, which are disposed in a fan rack so as to build up a set of heat-dissipating fans with strong cooling air current. In a server, the conventional fan module is assembled mostly by using screws to make fans and a fixing frame fixed at a case assembled together. In order to make the fans fixed at the fixed frame, at least four screws are commonly used. The screws go through four corners of the fixed frame and are fastened into a fan. When an assembler fastens the screws, since sometime the thread holes are too close to the case, the operation space is limited which makes the fastening operation inconvenient. In this regard, the conventional assembling way for fixing a fan module at a case needs to be improved.

SUMMARY OF THE INVENTION

Accordingly, the invention is directed to a fan unit assembly able to make the fan units simply and fast assembled.

The invention provides a fan unit assembly suitable for an electronic apparatus and includes a fan rack, a plurality of fan units and a plurality of handles. The fan rack includes a carrier and a plurality of partition boards. The partition boards are parallel to each other and erected on the carrier so as to define a plurality of fan-disposing regions together with the carrier, in which each of the partition boards has at least one first positioning part and at least one first guiding part both facing the corresponding fan-disposing region. The fan units are respectively disposed in the fan-disposing regions, in which each of the fan units has a front surface and two opposite side surfaces, the front surface is connected to the side surfaces, the side surfaces respectively have a second guiding part facing the corresponding partition board thereon, each of the first guiding parts and the corresponding second guiding part are matched with each other, and when each of the fan units is assembled to the corresponding fan-disposing region, the fan unit can move along the first guiding parts on the corresponding partition boards through the two second guiding parts. The handles are respectively disposed at the front surface of each of the fan units, in which both ends of each of the handles are bent to form two pivot portions, and the two pivot portions are respectively pivoted on the two side surfaces to make the handle suitable to rotate relatively to the fan unit, the two pivot portions of each of the handles respectively have a second positioning part, and when each of the fan units is disposed into the fan-disposing region and the handle rotates towards the front surface, the two second positioning parts of each of the handles are suitable to respectively interfere with the two first positioning parts on the corresponding partition boards.

In an embodiment of the present invention, the above-mentioned first positioning parts include a positioning pillar protruding towards the fan unit. Each of the second positioning parts includes a positioning slot corresponding to the positioning pillar. Each of the positioning slots has an open end, and when each of the fan units is disposed into the fan-disposing region and the handle rotates towards the front surface. Each of the positioning pillars is suitable to enter the positioning slot from the open end of the corresponding positioning slot.

In an embodiment of the present invention, the above-mentioned first guiding parts include a supporting portion protruding towards each of the fan units. Each of the second guiding parts includes two protruding ribs parallel to each other facing the corresponding partition board. The two protruding ribs form a guiding slot therebetween and the supporting portion is suitable to move within the guiding slot.

In an embodiment of the present invention, the above-mentioned supporting portion is formed through directly punching the partition board.

In an embodiment of the present invention, the above-mentioned electronic apparatus further has a bottom board and a motherboard module. The carrier is a part of the bottom board. The motherboard module is disposed on the bottom board, and the motherboard module further includes a plurality of first connectors disposed thereon. Each of the fan units further includes a second connector, and the second connector is suitable to respectively connect the first connector when the fan unit is disposed into the fan-disposing region.

In an embodiment of the present invention, the above-mentioned handle further has a leaning part. When the fan unit is disposed into the fan-disposing region and the handle rotates towards the front surface, the leaning part leans against the second connector so as to press the second connector onto the first connector.

In an embodiment of the present invention, the above-mentioned fan unit further includes a frame, a fan and a plurality of flexible parts. The frame is assembled on the fan rack and includes a first board, a second board and two third boards. The first board and the second board are disposed opposite to each other. The third boards are respectively connected to the first board and the second board. The fan is disposed in the frame. The flexible parts are respectively disposed between the first board and the fan and between the second board and the fan, in which the fan hangs on the frame by the flexible parts.

In an embodiment of the present invention, each of the above-mentioned flexible parts includes a fixing portion, a spacing portion and a plugging portion, in which the fixing portion is connected to the frame, the spacing portion is leaned between the frame and the fan and the plugging portion is plugged into an opening of the fan.

In an embodiment of the present invention, the upper and lower ends of the above-mentioned first board and the second board respectively have at least one upper flange and at least one lower flange disposed thereon, the upper flange and the lower flange are made of damping material and when each of the fan units is disposed into the fan-disposing region, the lower flange leans on the carrier.

In an embodiment of the present invention, the above-mentioned electronic apparatus further includes a top lid, and when the top lid covers the fan unit assembly, the fan unit leans on the top lid through the upper flange only.

Based on the description above, the invention employs the handles disposed at the front surface of the fan unit where the pivot portions at both ends of each of the handles are respectively pivoted on the side surfaces of the fan unit so that the handles are suitable to rotate relatively to the fan unit. The side surfaces of the fan unit respectively have a second guiding part disposed thereon. In addition, the first guiding parts corresponding to the second guiding parts are respectively disposed at the two partition boards corresponding to the side surfaces. In this way, when each of the fan units is disposed into the fan-disposing region, the fan unit can be smoothly guided into the fan-disposing region through the engagement of the first guiding part and the second guiding part. At the time, a user can rotate the handle towards the front surface, so that the second positioning parts of each of the handles are locked with the first positioning parts on the two sides of the partition boards, which further makes the fan unit fixed in the fan-disposing region and can avoid the complicated and inconvenient operation of fastening screws.

In order to make the aforementioned and other features and advantages of the invention comprehensible, several exemplary embodiments accompanied with figures are described in detail below.

DESCRIPTION OF THE EMBODIMENTS

Figure 1:
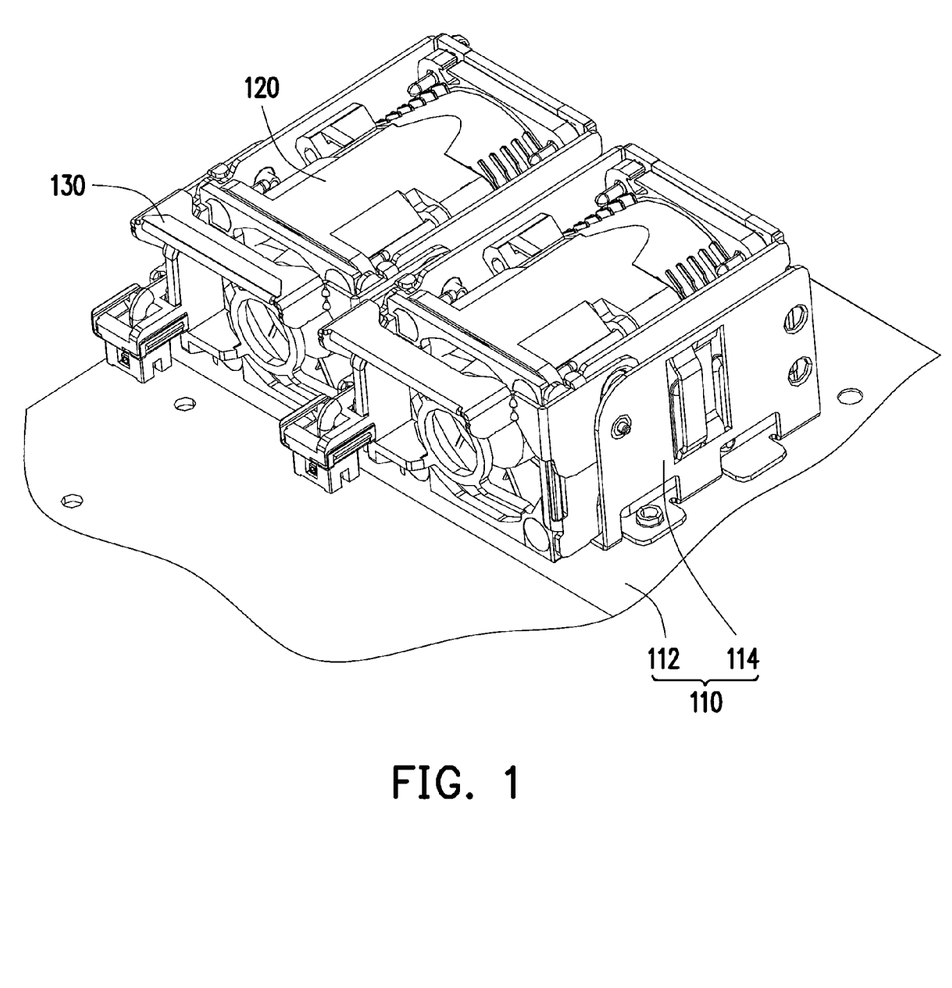
FIG. 1 is a schematic diagram of a fan unit assembly according to an embodiment of the invention.
Figure 2:
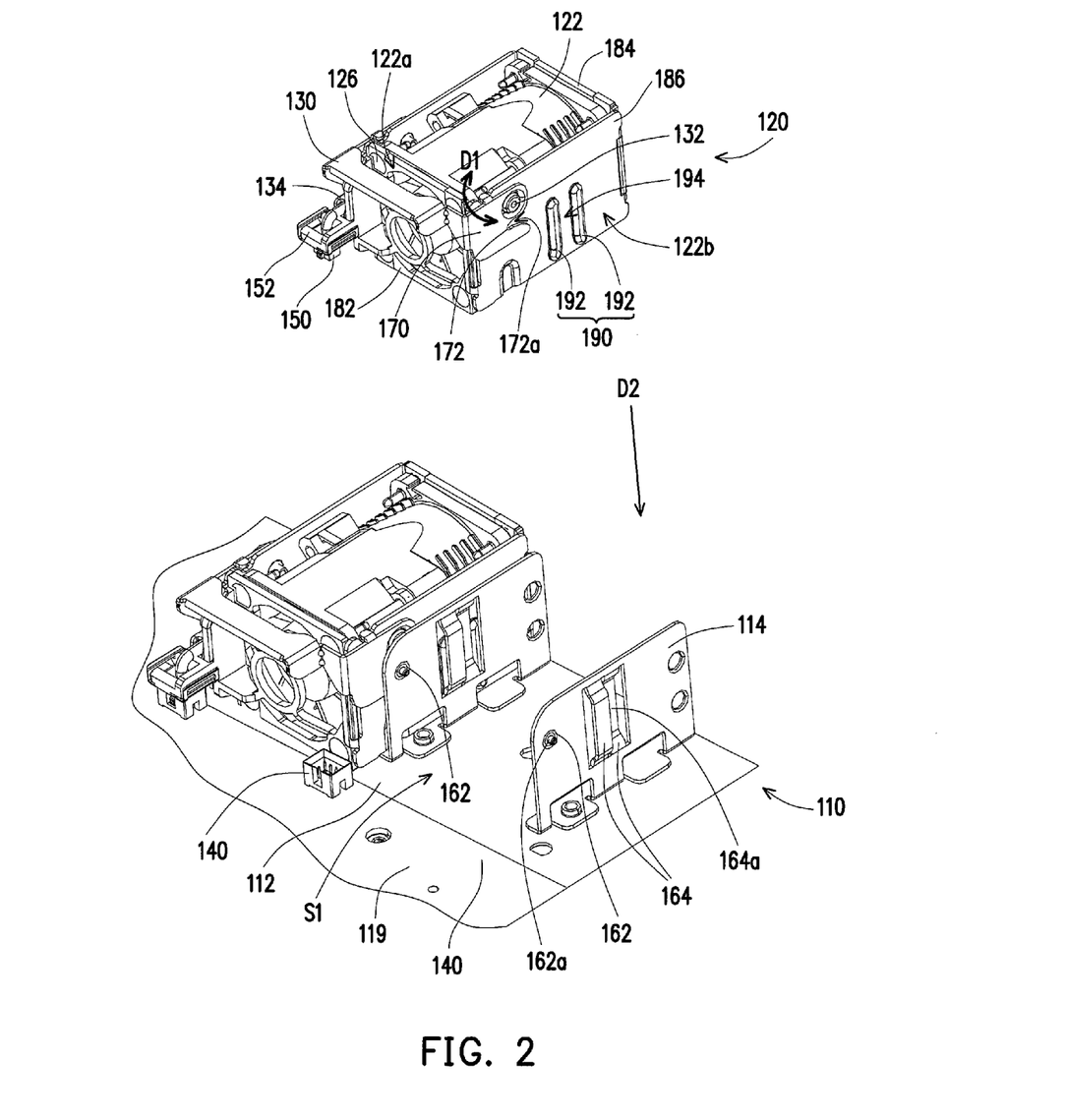
FIG. 2 is an assembly diagram of the fan unit assembly of FIG. 1.

FIG. 1 is a schematic diagram of a fan unit assembly according to an embodiment of the invention and FIG. 2 is an assembly diagram of the fan unit assembly of FIG. 1. Referring to FIGS. 1 and 2, a fan unit assembly 10 of the embodiment is suitable for an electronic apparatus and includes a fan rack 110, a plurality of fan units 120 and a plurality of handles 130. The fan rack 110 includes a carrier 112 and a plurality of partition boards 114. The partition boards 114 are parallel to each other and erected on the carrier 112, and with the carrier 112 together define a plurality of fan-disposing regions S1. The fan units 120 are respectively disposed in the corresponding fan-disposing regions S1. Each of the partition boards 114 has a first positioning part 162 and at least one first guiding part 164 both facing towards the corresponding fan-disposing regions S1.

The fan units 120 are disposed in the fan-disposing regions S1 and respectively have a front surface 122a and two opposite side surfaces 122b, in which the front surface 122a is connected to the side surfaces 122b. The two adjacent fan-disposing regions S1 share a partition board 114, while both sides of the partition board 114 respectively face a corresponding fan unit 120 and respectively have a first guiding part 164. Both side surfaces 122b of each the fan unit 120 respectively have a second guiding part 190 facing the corresponding partition board 114, and each the first guiding part 164 and the corresponding second guiding part 190 are engaged with each other. When each of the fan units 120 is disposed into the corresponding fan-disposing region S1, the fan unit 120 can move along the first guiding part 164 on the corresponding partition board 114 through the second guiding part 190. The handle 130 is disposed at the front surface 122a and both ends of the handle 130 are bent to form two pivot portions 132, in which the two pivot portions 132 are respectively pivoted on the two side surfaces 122b so that the handle 130 is suitable to rotate relatively to the fan unit 120. The pivot portions 132 of each of the handle 130 respectively have a second positioning part 170. When each of the fan units 120 is disposed into the fan-disposing region S1 and the handle 130 rotates towards the front surface 122a, the two second positioning part 170 on each of the handle 130 would interfere respectively with the two first positioning parts 162 on the corresponding two partition boards 114.

In more details, the first positioning part 162 includes a positioning pillar 162a protruding towards the fan unit 120 and the second positioning part 170 includes a positioning slot 172 corresponding to the positioning pillar 162a. The positioning slot 172 has an open end 172a, so that the positioning pillar 162a is suitable to enter the positioning slot 172 from the open end 172a and to lock the positioning slot 172. However, the invention is not limited to the above-mentioned design of the first positioning part 162 and the second positioning part 170. In fact, any designs able to make the second guiding part 190 interfere with the first positioning part 162 so that the second positioning part 170 locks the first positioning part 162 on the partition board 114 by rotating the handle 130 towards the front surface 122a of the fan unit 120 all belong to the claim scope of the invention.

The first guiding part 164 includes a supporting portion 164a protruding towards the fan unit 120, and the supporting portion 164a is suitable to be integrated formed with the partition board 114, for example, the supporting portion 164a can be formed by directly punching the partition board 114. The second guiding part 190 includes two protruding ribs 192 parallel to each other and facing the corresponding partition board 114. The protruding ribs 192 form a guiding slot 194 therebetween so that the fan unit 120 is suitable to move along the supporting portion 164a of the corresponding partition board 114 through the guiding slot 194. The engaged structure design of the first guiding part 164 and the second guiding part 190 is not limited to the above-mentioned way; for example, the first guiding part 164 can be two protruding ribs and the second guiding part 190 can be a supporting portion, which the invention is not limited to.

With the above-mentioned layout, when each of the fan units 120 is disposed into the fan-disposing region S1 along an assembling direction D2, the fan unit 120 can be smoothly guided and disposed into the fan-disposing region S1 by using the structure engaged between the protruding ribs 192 and the supporting portion 164a on the corresponding partition board 114. At the time, the user can rotate the handle 130 along a rotation direction D1 towards the front surface 122a, so that the second positioning part 170 of the handle 130 interferes with the first positioning part 162 of the partition board 114 and the fan unit 120 is locked in the fan-disposing region S1.

Figure 3:
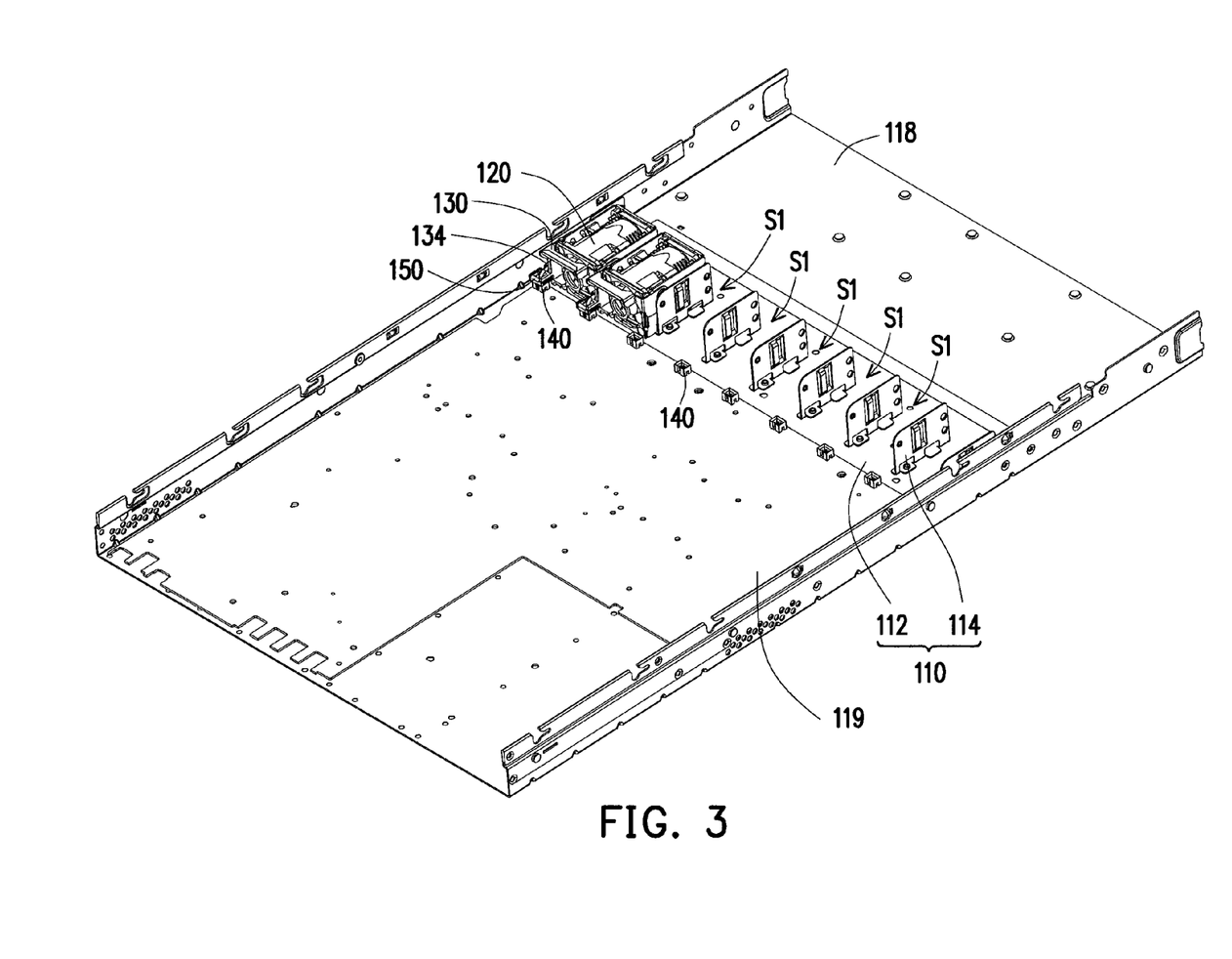
FIG. 3 is a schematic diagram of a fan unit assembly according to another embodiment of the invention.

FIG. 3 is a schematic diagram of a fan unit assembly according to another embodiment of the invention. Referring to FIGS. 1 and 3, in the embodiment, a fan unit assembly 10 is suitable to be used in an electronic apparatus, in which the electronic apparatus further has a bottom board 118 and a motherboard module 119, and the carrier 112 herein is a part of the bottom board 118 and the motherboard module 119 is disposed on the bottom board 118. The motherboard module 119 further includes a plurality of first connectors 140 disposed thereon. Each of the fan units 120 further includes a second connector 150, which is suitable to respectively connect the corresponding first connector 140 when the fan unit 120 is disposed into the fan-disposing region S1.

Figure 4:
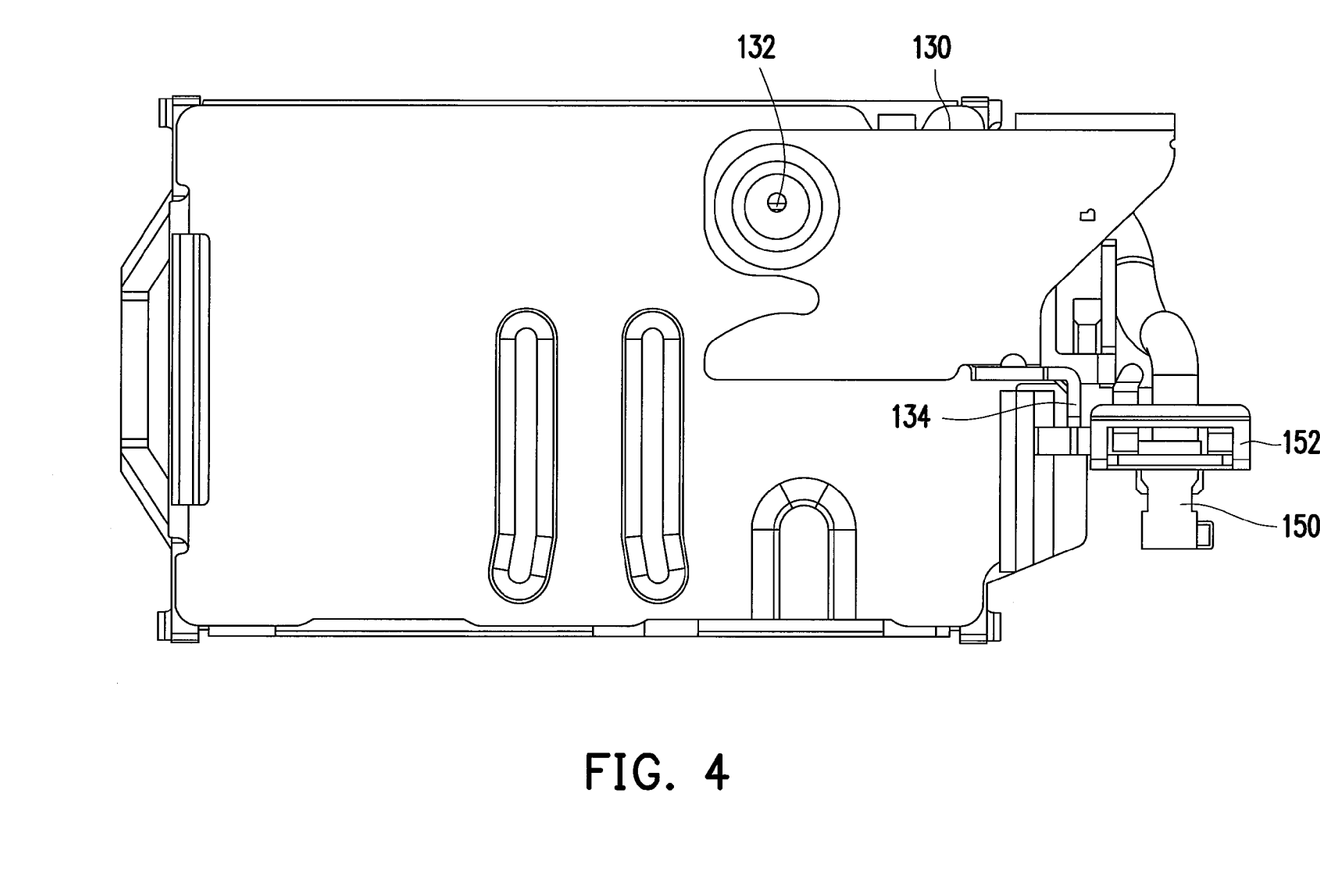
FIG. 4 is a side view of a fan unit.

FIG. 4 is a side view of a fan unit. Referring to FIGS. 2 and 4, the handle 130 herein further has a leaning part 134 and the second connector 150 further has a cable-organizing part 152. The cable-organizing part 152 is disposed at the top of the second connector 150 for converging the wires of the second connector 150 into a bundle. When each of the fan units 120 is disposed into the fan-disposing region S1 and the handle 130 rotates towards the front surface 122a, the second positioning part 170 of the handle 130 locks the first positioning part 162, while the leaning part 134 is leaned against the top of the cable-organizing part 152, so that the second connector 150 presses the first connector 140 thereon to ensure the second connector 150 and the first connector 140 stay electronically connected.

Figure 5:
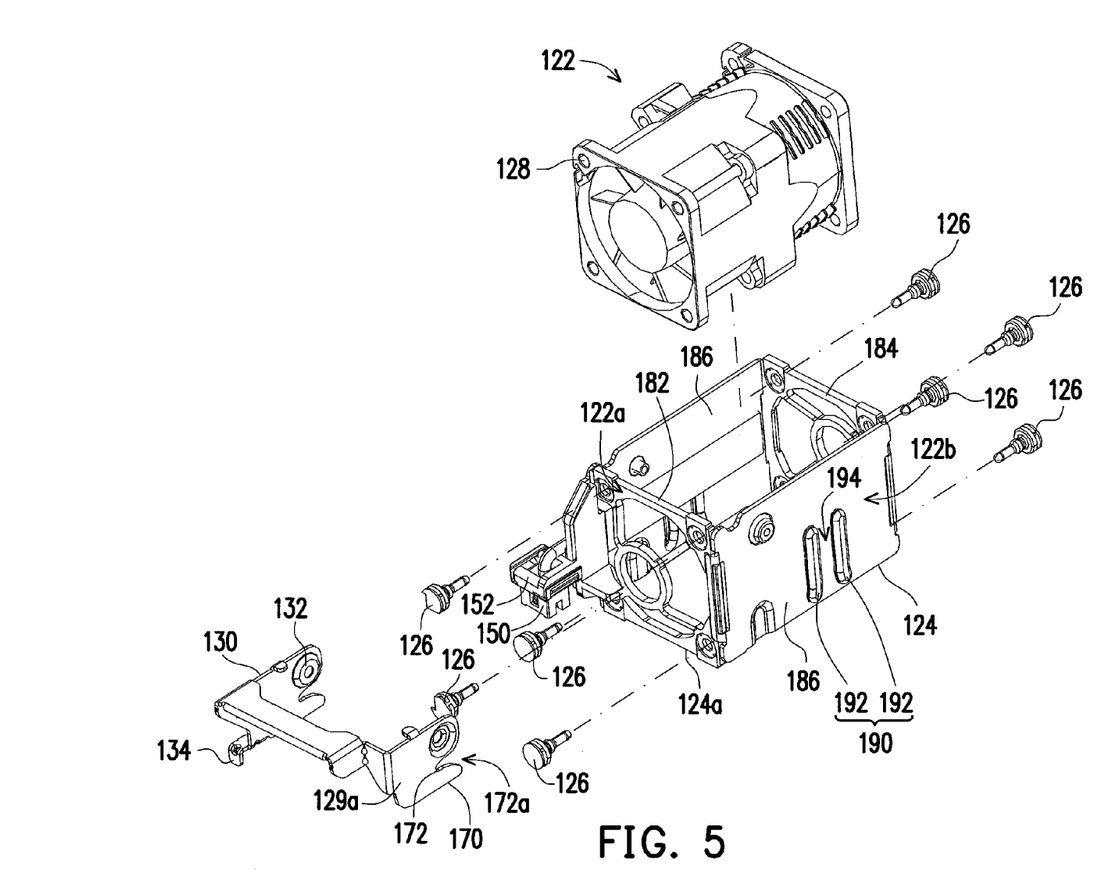
FIG. 5 is an exploded diagram of the fan unit.
Figure 6:
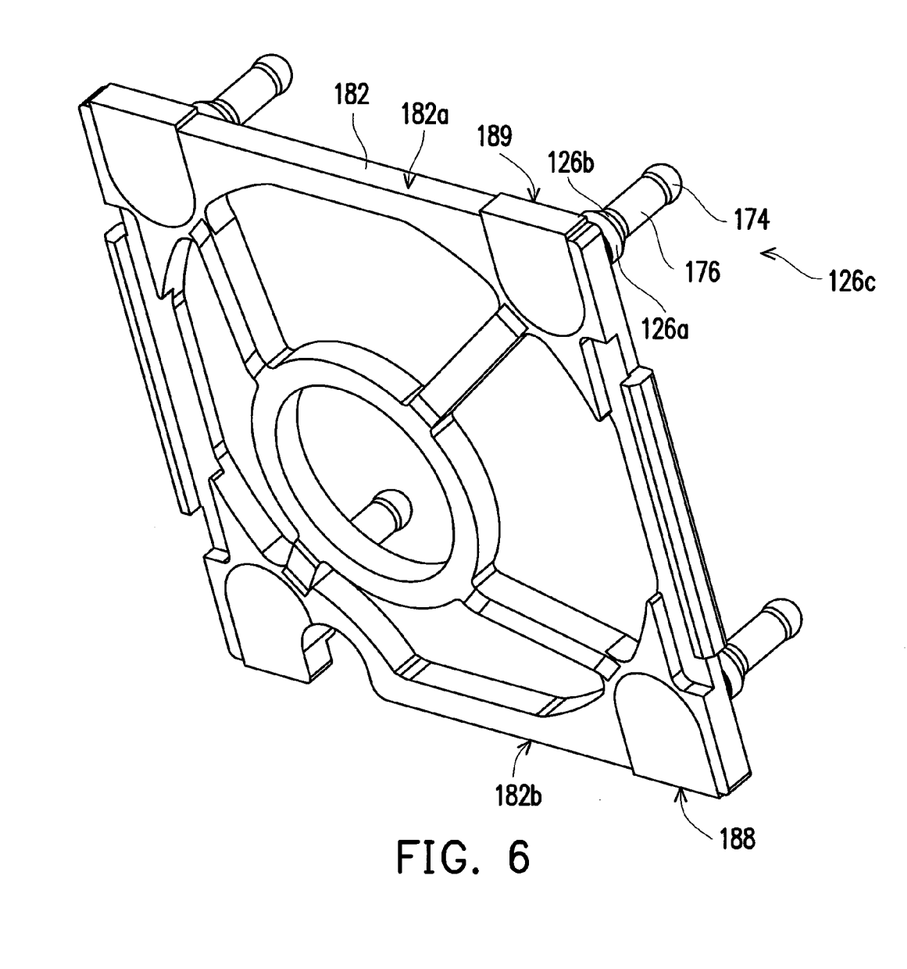
FIG. 6 is a schematic diagram of the first board and the flexible parts.

FIG. 5 is an exploded diagram of the fan unit and FIG. 6 is a schematic diagram of the first board and the flexible parts. Referring to FIGS. 5 and 6, in detail, the fan unit 120 further includes a fan 122, a frame 124 and a plurality of flexible parts 126. The fan 122 has a plurality of openings 128 disposed corresponding to the flexible parts 126. The flexible parts 126 should be made of elastic materials, for example, rubber. The frame 124 further includes a first board 182, a second board 184 and two third boards 186. The first board 182 is disposed opposite to the second board 184 and the third boards 186 are connected respectively to the first board 182 and the second board 184. The above-mentioned second guiding part 190, protruding ribs 192 and guiding slots 194 located on the two side surfaces 122b of the fan unit 120 are respectively disposed on the two third boards 186.

The flexible parts 126 are respectively disposed on the first board 182 and the second board 184 and respectively have a fixing portion 126a, a spacing portion 126b and a plugging portion 126c. The fixing portion 126a is fixed respectively at the first board 182 and the second board 184 and is embedded in the first board 182 and the second board 184. The spacing portion 126b is located between the fixing portion 126a and the plugging portion 126c and leaning between the frame 124 and the fan 122, and the plugging portion 126c is plugged into the corresponding opening 128 on the fan 122. The plugging portion 126c has a head part 174 and a neck part 176. The diameter of the head part 174 herein is substantially greater than the diameter of the neck part 176, so that when the plugging portion 126c is plugging into the opening 128, the head part 174 passes through the opening 128 and, at the time, the plugging portion 126c interferes with the fan 122 since the diameter of the head part 174 is slightly greater than the diameter of the opening 128, and the neck part 176 is engaged with the opening 128. As a result, the fan 122 hangs onto the frame 124 through the flexible parts 126.

The first board 182 and the second board 184 respectively have an upper edge 182a and a lower edge 182b, in which the upper edge 182a has at least one upper flange 189 and the lower edge 182b has at least one lower flange 188. In the embodiment, the numbers of the upper flanges 189 and the lower flanges 188 are both two and they are respectively located at the left and the right sides of the upper edge 182a and the lower edge 182b of each of the first board 182 and the second board 184. When each of the fan units 120 is disposed into the fan-disposing region S1, the lower flanges 188 lean on the carrier 112. The fan unit 120 further includes a top lid (not shown). When the top lid covers the fan unit assembly 10, the fan unit 120 leans on the top lid only through the upper flanges 189. Since the fan unit 120 leans on the top lid and the carrier 112 only through the upper flanges 189 and the lower flanges 188, and the upper flange 189 and the lower flange 188 are made of damping material, the impact on other electronic components of the electronic apparatus due to the vibration caused by the operation of the fan 122 can be significantly reduced.

The vibration-absorbing characteristic of the flexible parts 126 helps absorbing the vibration caused by the operation of the fan 122 and blocks the transmission path of the vibration, so that the vibration is unlikely to be transmitted out of the frame 124, which reduces the vibration and the noise produced during running the fan 122. In addition, since the fan 122 does not directly contact the bottom board and the top lid, the fan 122 in operation does not affect the operations of other electronic components in the electronic apparatus.

When a user wants to assemble the fan unit 120, it is needed only to plug the flexible parts 126 of the first board 182 and the second board 184 into the corresponding openings 128 of the fan 122 where the flexible parts 126 are engaged with the openings 128, followed by respectively fixing the two third boards 186 on the first board 182 and the second board 184. In this way, the two third boards 186 are located at the opposite sides of the fan 122 and connected respectively to the first board 182 and the second board 184, so as to fix the fan 122 on the frame 124.

In summary, the invention employs a handle able to rotate relatively to the fan unit disposed at the front surface of each fan unit. Meanwhile, two second guiding parts are respectively disposed at two side surfaces of the fan unit, and two first guiding parts corresponding to the second guiding parts are respectively disposed on the two partition boards corresponding to the two side surfaces. The fan unit is disposed into the fan-disposing region though the engagement of the second guiding parts and the first guiding parts. Then, the handle rotates towards the fan unit until the second positioning part of the handle locks the first positioning part on the corresponding partition board, so that the fan unit is fixed in the fan-disposing region. In addition, the invention further employs a plurality of flexible parts disposed on the frame and respectively plugged into a plurality of the corresponding openings of the fan, so that the fan hangs on the frame through the flexible parts to absorb the vibration caused by the operation of the fan and block the transmission path of the vibration. Therefore, the invention certainly improves the efficiency and the convenience for assembling the fan units.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A fan unit assembly, suitable for an electronic apparatus and comprising:
   a fan rack, comprising:
   a carrier; and
   a plurality of partition boards, parallel to each other and erected on the carrier so as to define a plurality of fan-disposing regions together with the carrier, wherein each of the partition boards has at least one first positioning part and at least one first guiding part both facing the corresponding fan-disposing region;

a plurality of fan units, respectively disposed in the fan-disposing regions, wherein each of the fan units has a front surface and two opposite side surfaces, the front surface is connected to the two side surfaces, the two side surfaces respectively have a second guiding part facing the corresponding partition board thereon, each of the first guiding parts and the corresponding second guiding part are engaged with each other, and when each of the fan units is assembled to the corresponding fan-disposing region, the fan unit can move along the first guiding parts of the corresponding two partition boards through the two second guiding parts; and a plurality of handles, respectively disposed at the front surface of each of the fan units, wherein both ends of each of the handles are bent to form two pivot portions, wherein the two pivot portions are respectively pivoted on the two side surfaces to make the handle suitable to rotate relatively to the fan unit, the two pivot portions of each of the handles respectively have a second positioning part, and when each of the fan units is disposed into the fan-disposing region and the handle rotates towards the front surface, the two second positioning parts of each of the handles are suitable to respectively interfere with the two first positioning parts on the corresponding two partition boards.

2. The fan unit assembly as claimed in claim 1, wherein each of the first positioning parts comprises a positioning pillar protruding towards the fan unit, each of the second positioning parts comprises a positioning slot corresponding to the positioning pillar, each of the positioning slots has an open end, and when each of the fan units is disposed into the fan-disposing region and the handle rotates towards the front surface, each of the positioning pillars is suitable to enter the positioning slot from the open end of the corresponding positioning slot.

3. The fan unit assembly as claimed in claim 1, wherein each of the first guiding parts comprises a supporting portion protruding towards each of the fan units, each of the second guiding parts comprises two protruding ribs parallel to each other facing the corresponding partition board, the two protruding ribs form a guiding slot therebetween and the supporting portion is suitable to move within the guiding slot.

4. The fan unit assembly as claimed in claim 3, wherein the supporting portion is formed through directly punching the partition board.

5. The fan unit assembly as claimed in claim 1, wherein the electronic apparatus further has a bottom board and a motherboard module, the carrier is a part of the bottom board, the motherboard module is disposed on the bottom board, the motherboard module further comprises a plurality of first connectors disposed thereon, each of the fan units further comprises a second connector, and the second connector is suitable to respectively connect the first connector when the fan unit is disposed into the fan-disposing region.

6. The fan unit assembly as claimed in claim 5, wherein the handle further has a leaning part, when the fan unit is disposed into the fan-disposing region and the handle rotates towards the front surface, the leaning part leans against the second connector so as to press the second connector onto the first connector.

7. The fan unit assembly as claimed in claim 1, wherein the fan unit comprises:
a frame, assembled on the fan rack and comprising:
a first board;
a second board, disposed opposite to the first board; and
two third boards, respectively connected to the first board and the second board;
a fan, disposed in the frame; and
a plurality of flexible parts, respectively disposed between the first board and the fan and between the second board and the fan, wherein the fan hangs on the frame through the flexible parts.

8. The fan unit assembly as claimed in claim 7, wherein each of the flexible parts comprises a fixing portion, a spacing portion and a plugging portion, the fixing portion is respectively embedded in the first board and the second board, the spacing portion is supported between the frame and the fan and the plugging portion is plugged into an opening of the fan.

9. The fan unit assembly as claimed in claim 7, wherein the upper and lower two ends of the first board and the second board respectively have at least one upper flange and at least one lower flange disposed thereon, the upper flange and the lower flange are made of damping material and when each of the fan units is disposed into the fan-disposing region, the lower flange leans on the carrier.

10. The fan unit assembly as claimed in claim 9, wherein the electronic apparatus further comprises a top lid, and when the top lid covers the fan unit assembly, the fan unit leans on the top lid through the upper flange only.

* * * * *